United States Patent
Webster et al.

(10) Patent No.: US 10,908,883 B2
(45) Date of Patent: Feb. 2, 2021

(54) VOICE INTERACTION DEVELOPMENT TOOL

(71) Applicant: Adobe Inc., San Jose, CA (US)

(72) Inventors: Mark C. Webster, New York, NY (US); Susse Soenderby Jensen, Brooklyn, NY (US); Scott Thomas Werner, Brooklyn, NY (US); Daniel Cameron Cundiff, Brooklyn, NY (US); Blake Allen Clayton Sawyer, Astoria, NY (US)

(73) Assignee: Adobe Inc., San Jose, CA (US)

( * ) Notice: Subject to any disclaimer, the term of this patent is extended or adjusted under 35 U.S.C. 154(b) by 74 days.

(21) Appl. No.: 16/189,063

(22) Filed: Nov. 13, 2018

(65) Prior Publication Data

US 2020/0150934 A1    May 14, 2020

(51) Int. Cl.
  *G10L 15/22*    (2006.01)
  *G06F 8/38*    (2018.01)
  (Continued)

(52) U.S. Cl.
  CPC ............... *G06F 8/38* (2013.01); *G06F 3/167* (2013.01); *G06F 8/34* (2013.01); *G10L 15/063* (2013.01); *G10L 2015/0638* (2013.01)

(58) Field of Classification Search
  CPC ... G10L 15/22; G10L 2015/223; G06F 3/167; G06F 8/38
  See application file for complete search history.

(56) References Cited

U.S. PATENT DOCUMENTS 6,360,237 B1    3/2002   Schulz et al.
6,738,964 B1 *  5/2004   Zink .................. G06F 30/30
                                                     717/105
(Continued)

FOREIGN PATENT DOCUMENTS

WO    WO-2006110982 A1 * 10/2006 ............... G06F 8/38

OTHER PUBLICATIONS

"Voicegram by Sayspring", Retrieved at: https://www.producthunt.com/posts/voicegram-by-sayspring—on Dec. 5, 2019, 5 pages.
(Continued)

*Primary Examiner* — Jakieda R Jackson
(74) *Attorney, Agent, or Firm* — SBMC

(57) ABSTRACT

A voice interaction development tool is described. Initially, user input associating voice interaction data with a visual object is received via a user interface. The voice interaction data, for example, may include voice commands and corresponding output content. Subsequently, a request is received from a voice assistant platform, due to initiation via a voice command to the voice assistant platform. In real-time (e.g., as the user speaks the voice command) a visual object corresponding to the spoken voice command is graphically indicated, e.g., a flow diagram element corresponding to the voice command is emphasized. In real-time as output content corresponding to the voice command is output by a voice assistant device, the user interface provides a graphical indication of the visual object associated with the output content. In this way, the described system provides graphical feedback for testing voice interactions being developed.

20 Claims, 9 Drawing Sheets

(51) Int. Cl.
    *G10L 15/06* (2013.01)
    *G06F 8/34* (2018.01)
    *G06F 3/16* (2006.01)

(56) References Cited

U.S. PATENT DOCUMENTS

| | | | |
|---|---|---|---|
| 7,624,007 B2 | 11/2009 | Bennett | |
| 8,086,995 B2* | 12/2011 | Luo | G06F 8/38 |
| | | | 717/105 |
| 8,639,032 B1 | 1/2014 | Voorhees et al. | |
| 9,172,738 B1* | 10/2015 | daCosta | H04L 67/00 |
| 9,619,202 B1* | 4/2017 | Weingartner | G06F 3/0482 |
| 10,185,556 B2* | 1/2019 | Richstein | G06Q 10/101 |
| 10,262,281 B1* | 4/2019 | Vitek | G06Q 10/063114 |
| 10,379,808 B1* | 8/2019 | Angel | G06F 3/167 |
| 10,423,303 B1* | 9/2019 | Roach | G06F 3/04883 |
| 10,531,157 B1* | 1/2020 | Loritsch | G06F 3/165 |
| 10,847,156 B2 | 11/2020 | Webster et al. | |
| 2004/0015841 A1* | 1/2004 | Lepejian | G06F 8/20 |
| | | | 717/109 |
| 2004/0027379 A1* | 2/2004 | Hong Huey | G06F 8/38 |
| | | | 715/764 |
| 2004/0061722 A1* | 4/2004 | Christopher | G09G 5/00 |
| | | | 715/771 |
| 2005/0091057 A1 | 4/2005 | Phillips et al. | |
| 2006/0235699 A1 | 10/2006 | Dhanakshirur et al. | |
| 2008/0154590 A1 | 6/2008 | Doyle | |
| 2008/0255845 A1 | 10/2008 | Bennett | |
| 2008/0276159 A1 | 11/2008 | Narayanaswami et al. | |
| 2008/0304632 A1 | 12/2008 | Catlin et al. | |
| 2008/0319762 A1* | 12/2008 | Da Palma | H04L 67/02 |
| | | | 704/275 |
| 2009/0141871 A1* | 6/2009 | Horioka | H04M 3/493 |
| | | | 379/88.04 |
| 2011/0022393 A1* | 1/2011 | Waller | G06F 3/038 |
| | | | 704/270 |
| 2011/0161347 A1 | 6/2011 | Johnston | |
| 2011/0202562 A1 | 8/2011 | Bloch et al. | |
| 2012/0010876 A1 | 1/2012 | Smolenski et al. | |
| 2012/0081371 A1* | 4/2012 | Ozkaragoz | G06F 40/58 |
| | | | 345/467 |
| 2012/0221998 A1* | 8/2012 | Rowley | G06F 9/451 |
| | | | 717/105 |
| 2013/0179173 A1* | 7/2013 | Lee | G10L 15/22 |
| | | | 704/275 |
| 2013/0317921 A1* | 11/2013 | Havas | G06Q 30/0641 |
| | | | 705/15 |
| 2014/0244712 A1* | 8/2014 | Walters | G06F 3/167 |
| | | | 709/202 |
| 2014/0310004 A1 | 10/2014 | Zhang | |
| 2014/0372892 A1* | 12/2014 | Payzer | G10L 15/22 |
| | | | 715/728 |
| 2015/0348551 A1 | 12/2015 | Gruber et al. | |
| 2015/0350443 A1* | 12/2015 | Kumar | H04M 3/5183 |
| | | | 379/265.13 |
| 2016/0026608 A1 | 1/2016 | Curin et al. | |
| 2016/0307439 A1* | 10/2016 | Selfe | G08C 17/02 |
| 2016/0307575 A1* | 10/2016 | Cha | H04N 21/4826 |
| 2017/0018041 A1* | 1/2017 | Fox | G06Q 10/02 |
| 2017/0060348 A1* | 3/2017 | Kongot | G06T 11/206 |
| 2017/0140449 A1* | 5/2017 | Kannan | G06Q 30/016 |
| 2017/0162198 A1* | 6/2017 | Chakladar | G10L 15/22 |
| 2017/0236512 A1* | 8/2017 | Williams | G06F 40/40 |
| | | | 381/79 |
| 2017/0308361 A1* | 10/2017 | Brezinsky | H04M 3/527 |
| 2018/0047391 A1* | 2/2018 | Baik | G10L 21/10 |
| 2018/0061420 A1* | 3/2018 | Patil | G10L 15/22 |
| 2018/0108351 A1* | 4/2018 | Beckhardt | G10L 15/32 |
| 2018/0204569 A1* | 7/2018 | Nadkar | G10L 15/22 |
| 2019/0004791 A1 | 1/2019 | Brebner | |
| 2019/0005957 A1* | 1/2019 | Yoon | G10L 15/22 |
| 2019/0012625 A1* | 1/2019 | Lawrenson | G06Q 50/12 |
| 2019/0066669 A1* | 2/2019 | Sabur | G06F 40/186 |
| 2019/0080698 A1* | 3/2019 | Miller | G10L 15/063 |
| 2019/0082043 A1* | 3/2019 | Lavian | G06F 16/23 |
| 2019/0166069 A1* | 5/2019 | Yao | G06F 3/0486 |
| 2019/0259386 A1 | 8/2019 | Kudurshian et al. | |
| 2020/0004874 A1* | 1/2020 | Gupta | G06F 3/167 |
| 2020/0007680 A1* | 1/2020 | Wozniak | H04M 3/493 |
| 2020/0034492 A1* | 1/2020 | Verbeke | G06F 40/40 |
| 2020/0125475 A1* | 4/2020 | Iyer | G06F 8/75 |
| 2020/0143820 A1 | 5/2020 | Donofrio et al. | |
| 2020/0168217 A1 | 5/2020 | Webster et al. | |
| 2020/0234697 A1 | 7/2020 | Webster et al. | |
| 2020/0234699 A1 | 7/2020 | Webster et al. | |

OTHER PUBLICATIONS

Webster,"Introducing Voicegram by Sayspring", Retrieved at: https://medium.com/vui-magazine/introducing-voicegram-by-sayspring-23273aa01af0, Feb. 6, 2018, 4 pages.

"Corrected Notice of Allowability", U.S. Appl. No. 16/203,526, dated Aug. 24, 2020, 2 pages.

"Notice of Allowance", U.S. Appl. No. 16/203,526, dated Jul. 13, 2020, 8 pages.

"Corrected Notice of Allowability", U.S. Appl. No. 16/203,526, dated Sep. 8, 2020, 3 pages.

"Non-Final Office Action", U.S. Appl. No. 16/255,481, dated Aug. 27, 2020, 9 pages.

"Pre-Interview First Office Action", U.S. Appl. No. 16/255,481, dated Sep. 9, 2020, 3 pages.

"Corrected Notice of Allowability", U.S. Appl. No. 16/203,526, dated Oct. 28, 2020, 2 pages.

"Notice of Allowance", U.S. Appl. No. 16/255,481, dated Nov. 24, 2020, 9 pages.

* cited by examiner

VOICE INTERACTION DEVELOPMENT TOOL

BACKGROUND

Users are interacting with voice assistant devices to accomplish an increasing number of different voice-assisted tasks. Generally speaking, such voice assistant devices are configured with one or more microphones to receive voice commands from a user. Examples of dedicated voice assistant device include the Amazon® Echo and Google® Home, which enable interactions with voice assistant platforms Amazon® Alexa and Google® Assistant, respectively. However, other devices, such as mobile phones, desktop computers, laptop computers, gaming systems, and so forth may also be configured as voice assistant devices capable of leveraging the functionality of a voice assistant platform. By way of example, an Apple® iPhone (a mobile phone) may serve as a voice assistant device, enabling a user to interact with the voice assistant platform Siri®.

Such voice assistant devices are configured to respond to the user's voice commands in a variety of different ways, such as by outputting an audible (voice) response via one or more speakers, displaying visual content, providing other visual effects (e.g., indications via light emitting diodes (LEDs)), providing tactile feedback, and so forth. Moreover, the voice assistant platform may cause other devices, e.g., a thermostat, speakers, lights, and so on, to respond to the user's voice command. A few examples of responses for home appliances include changing a temperature of a thermostat to adjust a house's temperature, beginning to play music from a music service over speakers, turning certain lights in the house on or off, and so forth.

In order to provide such functionality via voice-assisted interaction, it must be enabled by development and deployment of a software application, firmware, service, plug-in, script, and so forth. However, conventional tools for generating voice-assisted interactions need specific interaction data that conventional application development systems often do not support. Moreover, each voice assistant platform requires data to be formatted in different ways to provide voice assistance functionality, such as with different headers, different payloads, different metadata associated with requests and responses, and so forth. These platform-specific data needs make surfacing and manipulating the data unwieldy and cumbersome.

SUMMARY

To overcome these problems, a voice interaction development tool is leveraged in a digital medium environment. Initially, user input associating voice interaction data with a visual object (e.g., a visual flow diagram) is received via a user interface displayed by a client device. The voice interaction data, for example, may include voice commands and corresponding output content. The voice commands may be configured as audio data or text data indicative of speech of a user to a voice assistant device. In contrast, the output content represents the output of the voice assistant device in response to receipt of the voice command. The voice interaction data and the visual object are maintained in a remote storage device and/or locally as a file at the client device.

Subsequently, a request is received from a voice assistant platform. The request may be initiated via a voice command to the voice assistant platform. In real-time (e.g., as the user speaks the voice command) a visual object corresponding to the spoken voice command is graphically indicated, e.g., a flow diagram element corresponding to the voice command is highlighted or otherwise emphasized. Based on the request, output content corresponding to the voice command is identified in the maintained voice interaction data, and a response that includes the output content corresponding to the voice command is communicated to the voice assistant platform. Then, in real-time as the output content is output by a voice assistant device, the user interface is controlled to provide a graphical indication of the visual object associated with the output content of the voice interaction data. In this way, the described system provides graphical feedback for testing voice-assisted interactions being developed.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures.

DETAILED DESCRIPTION

Overview

Figure 1:
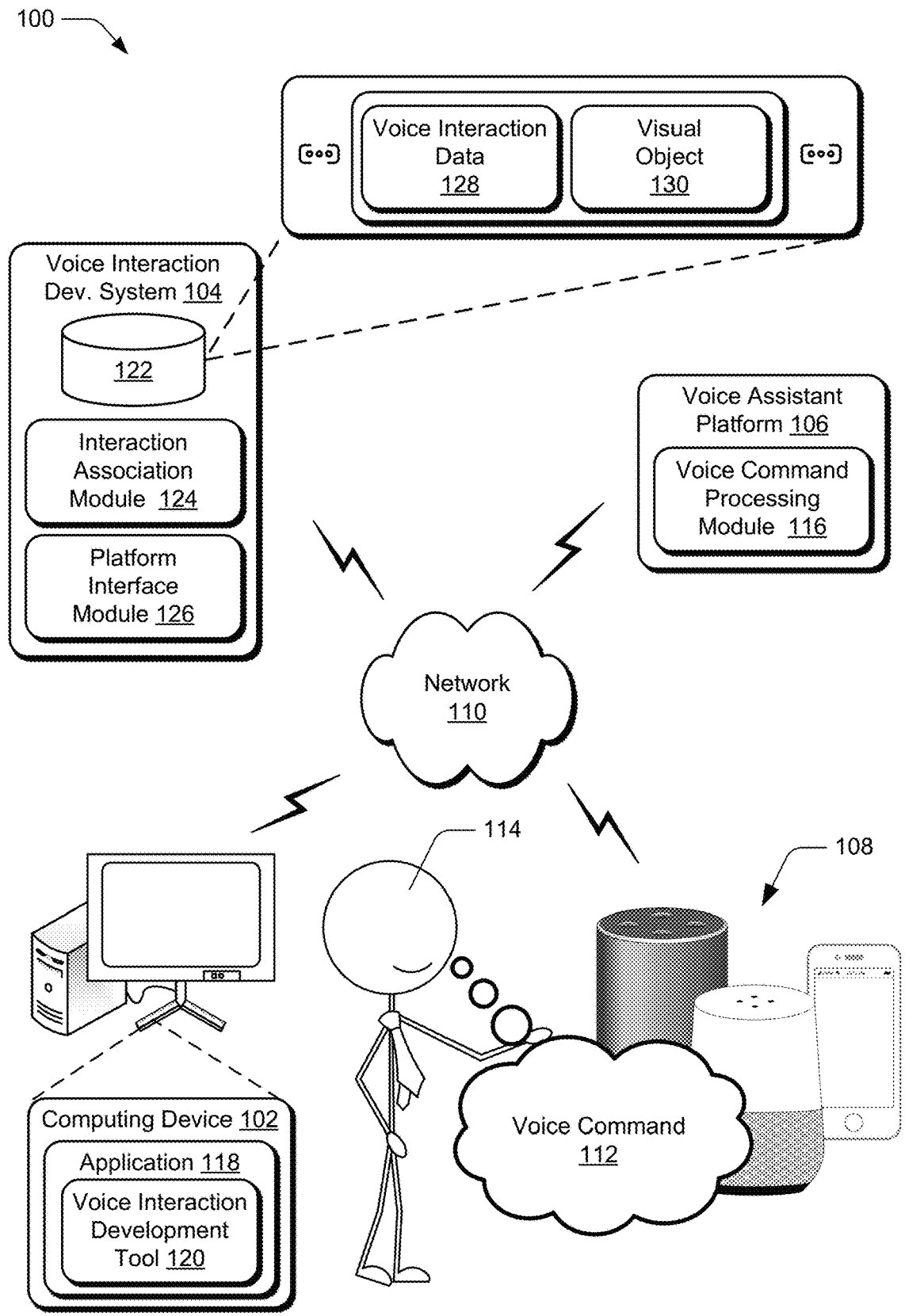
FIG. 1 is an illustration of an environment in an example implementation that is operable to employ techniques described herein.

Users are interacting with voice assistant devices to accomplish an increasing number of different voice-assisted tasks. In order to accomplish these tasks via voice-assisted interaction, the functionality to do so must be enabled by development and deployment of a software application, firmware, service, plug-in, script, and so forth. However, conventional tools for generating voice-assisted interactions need specific interaction data that conventional application development systems often do not support.

To overcome these problems, a voice interaction development tool is leveraged in a digital medium environment. The voice interaction development tool provides a user interface which enables a user to associate voice interaction data with a visual object. The voice interaction data, for example, may include voice commands and corresponding output content. The voice commands may be configured as audio data or text data indicative of speech of a user to a voice assistant device. In contrast, the output content represents the output of the voice assistant device in response to receipt of the voice command. In some cases, the output content is configured as data for audible output by the voice assistant device, e.g., audible speech. Additionally or alternately, the output content may be configured as data for display by the voice assistant device or another device. In response to a voice command such as "what's the weather," for instance, the output content may be a graphical user interface having a summary of upcoming weather and configured for output via a display of the voice assistant device.

In one or more implementations, the visual objects correspond to elements of a visual flow diagram. In this way, the voice interaction development tool enables association of the voice interaction data with a visual flow diagram which visually depicts the desired "flow" of the voice interaction functionality. Consider an example in which voice assistance is added to a computer program for taking and fulfilling a person's order at a restaurant. In this example, the interaction for taking and fulfilling the order are controlled by a digital flow diagram, which includes elements that represent various steps of the ordering process, such as different elements representing the steps of greeting a person, presenting a menu, asking the person what the person would like to order, receiving the person's order, and so forth. In this context, the voice interaction development tool enables a user to associate voice commands (e.g., "I would like . . . ") with the step of receiving the person's order. Notably, each element of the flow diagram may be associated with one or multiple speech phrases—based on a number of the voice commands represented by the voice interaction data. By way of example, a visual object that represents a particular flow diagram element for placing an order may be associated with multiple voice commands, such as "order," "place order," "place an order," and so on.

To associate a voice command with a particular element of a flow diagram, the voice interaction development tool may enable the user to select the particular element (e.g., using touch functionality) and specify different voice commands or responses that correspond to the particular element (e.g., by typing the commands or responses, speaking the commands or responses into a communicably coupled device, and so on).

The voice interaction data and the associated visual objects (e.g., flow diagram elements) may be maintained in a remote storage of the voice interaction development tool, such that the voice interaction data associated with the respective visual object can be retrieved from the storage based on identification of the visual object. In a similar manner, this enables the visual object associated with the respective voice interaction data to be retrieved from the storage based on identification of the voice interaction data.

Alternately or additionally, the voice interaction data may be stored locally at the client device. For instance, the voice interaction development tool may generate a file that includes the voice interaction data and the associated visual objects, and cause the file to be stored in storage of the client device. In one or more implementations, the voice interaction development tool synchronizes files stored locally at the client device with the associated interaction data stored remotely in the storage of the voice interaction development tool. Doing so enables collaboration between users by enabling changes made to a file to be synchronized.

The voice interaction development system is configured to interact with a plurality of different voice assistant platforms, such as Amazon® Echo, Google® Home, and so forth. Notably, each voice assistant platform may require data formatted in different ways to provide voice assistance functionality, such as with different headers, different payloads, different metadata associated with requests and responses, and so forth. Thus, the voice interaction development system provides formatted data indicative of the voice interaction data to the voice assistant platform. This formatted data enables provision of voice assistance via a voice assistant device corresponding to the voice assistant platform and is formatted in a format specific to the voice assistant platform. To this end, the described techniques are capable of identifying which of the plurality of voice assistant platforms is being leveraged to provide voice assistance and also providing voice interaction data to the identified platform in its respective format.

The voice interaction development tool is further configured to aid the design and development of voice-assisted interactions by enabling testing of the voice-assisted interactions created using the voice interaction development tool. To do so, the voice interaction development tool causes display of a user interface that includes display of a flow diagram for controlling a particular voice-assisted interaction. In real-time, as a user (e.g., a developer) speaks a voice command, the voice interaction development tool causes a flow diagram element corresponding to the spoken voice command to be graphically indicated (e.g., highlighted or otherwise emphasized) and the voice assistant device responds to the user by outputting response content, such as by outputting audible content, visual content, or some combination thereof. Based on the voice assistant device's response, the user may speak an additional voice command. In this scenario, the voice assistant interaction development tool can cause—also in real-time—a different flow diagram element corresponding to the additional voice command to be graphically indicated. The voice assistant device may also respond to this additional command by outputting additional response content.

In this way, the described system provides graphical feedback for testing voice-assisted interactions being developed. This graphical feedback enables problems with development of a voice-assisted interaction to be more easily identified than by using conventional techniques.

In the following discussion, an example environment is first described that may employ the techniques described herein. Example implementation details and procedures are then described which may be performed in the example environment as well as other environments. Consequently, performance of the example procedures is not limited to the example environment and the example environment is not limited to performance of the example procedures.

Example Environment

FIG. 1 is an illustration of an environment 100 in an example implementation that is operable to employ a voice interaction development tool as described herein. The illustrated environment 100 includes computing device 102, voice interaction development system 104, voice assistant platform 106, and various voice assistant devices 108 that are communicatively coupled, one to another, via a network 110.

Devices that are usable to implement the computing device 102, voice interaction development system 104, and voice assistant platform 106 may be configured in a variety of ways. These devices, for instance, may be configured as a desktop computer, a laptop computer, a mobile device (e.g., assuming a handheld configuration such as a tablet or mobile phone), and so forth. Thus, the device may range from full resource devices with substantial memory and processor resources (e.g., personal computers, game consoles) to a low-resource device with limited memory and/or processing resources (e.g., mobile devices). Additionally, a device may be representative of a plurality of different devices, such as multiple servers utilized by a business to perform operations "over the cloud" as further described in relation to FIG. 9.

The voice assistant devices 108 may also be configured in a variety of ways. Generally speaking, the voice assistant devices 108 are configured with one or more microphones to receive voice commands 112 from a user 114. Examples of dedicated voice assistant device 108 include the Amazon® Echo and Google® Home, which enable interactions with voice assistant platforms Amazon® Alexa and Google® Assistant, respectively. Other devices, such as mobile phones, desktop computers, laptop computers, gaming systems, and so forth may also be configured as voice assistant devices 108 capable of leveraging the functionality of a voice assistant platform. By way of example, an Apple® iPhone (a mobile phone) may serve as a voice assistant device 108, enabling a user 114 to interact with the voice assistant platform Siri®. To this end, the voice assistant devices 108 can be configured to receive user input through interfaces (e.g., touch, camera, etc.) in addition to receiving voice commands 112.

In any case, these voice assistant devices 108 interact with their respective voice assistant platform 106 to respond to the voice commands 112. The voice assistant platform 106 is illustrated having voice command processing module 116. The voice command processing module 116 represents functionality to receive a request initiated by the voice command 112, determine how to respond to the request, and provide a response to the voice assistant device 108 or any other devices that may be affected by the voice command 112, such as appliances within a connected home, service provider devices providing one or more respective services (e.g., facilitating delivery of goods by an e-commerce platform), and so on. Accordingly, the voice assistant devices 108 may be configured to respond to the user 114's voice commands in myriad ways, such as by outputting an audible (voice) response via one or more speakers, displaying visual content, providing other visual effects (e.g., indications via light emitting diodes (LEDs)), providing tactile feedback, and so forth. Moreover, the voice assistant platform 106 may cause other devices, e.g., a thermostat, speakers, lights, and so on, to respond to the user 114's voice command 112. A few examples of responses for home appliances include changing a temperature of a thermostat to adjust a house's temperature, beginning to play music from a music service over speakers, turning certain lights in the house on or off, and so forth. The voice commands 112 may be leveraged in a variety of settings (e.g., home, work, etc.) to initiate responses via one or more devices, including, but not limited to the voice assistant device 108.

In order to provide such functionality via voice-assisted interaction, it must be enabled by development and deployment of a software application, firmware, service, plug-in, script, and so forth. In the context of the illustrated environment 100, application 118 represents functionality to enable a user of the computing device 102 (e.g., a developer) to develop software applications, firmware, services, plug-ins, scripts, and so on. In accordance with the described techniques, the application 118 includes voice interaction development tool 120, which facilitates adding voice-assisted interactions to provision of various functionalities. By way of example, the voice interaction development tool 120 can facilitate adding voice assistance to a computer program for taking and fulfilling a person's order at a restaurant.

In some cases, voice interaction development tool 120 is implemented as a plug-in or extension for application 118. In this context, application 118 may be implemented as a "third-party" design application, such as Adobe® XD or Adobe® Sketch. However, application 118 may be implemented as a variety of different third-party content creation or editing applications, voice application development applications, development environments, and so forth. Application 118 may be a considered a third-party application relative to the voice assistant platform 106 insofar as application 118 is not otherwise associated with voice assistant platforms 106. In effect, voice interaction development tool 120 acts as an interface between various different types of voice assistant platforms 106 and various different third-party applications 118.

As part of facilitating the design and development of voice-assisted interactions, the voice interaction development tool 120 leverages functionality of the voice interaction development system 104. In the illustrated environment 100, the voice interaction development system 104 is depicted with storage 122, interaction association module 124, and platform interface module 126. Although illustrated with these particular components, it should be appreciated that the voice interaction development system 104 may include or have access to (e.g., via a cloud-computing service) more, fewer, and different components to provide the functionality described herein without departing from the spirit or scope thereof.

Broadly speaking, the voice interaction development tool 120 represents functionality to associate voice commands and responses of a voice assistant device 108 with different elements of a flow diagram which controls a particular voice interaction. Consider again the example in which voice assistance is added to a computer program for taking and fulfilling a person's order at a restaurant. In this example, the interaction for taking and fulfilling the order are controlled by a digital flow diagram, which includes elements that represent various steps of the ordering process, such as different elements representing the steps of greeting a person, presenting a menu, asking the person what the person would like to order, receiving the person's order, and so forth. In this context, the voice interaction development tool 120 represents functionality to associate voice commands (e.g., "I would like . . . ") with the step of receiving the person's order.

To associate a voice command with a particular element of a flow diagram, for instance, the voice interaction development tool 120 may enable the user 114 to select the particular element (e.g., using touch functionality) and specify different voice commands or responses that correspond to the particular element (e.g., by typing the commands or responses, speaking the commands or responses into a communicably coupled device, and so on). As used herein, these entered commands and responses may be referred to collectively as "voice interaction data." Additionally, an element of a flow diagram that defines a voice-assisted interaction is one example of a "visual object," as discussed herein.

The interaction association module 124 represents functionality to generate data describing an association indicated by user input to the voice interaction development tool 120 and between voice interaction data 128 and a visual object 130, such as data describing an association between a voice command ("I would like . . . ") and a flow diagram element that corresponds to receiving a person's order. In addition to generating data indicative of the association, the interaction association module 124 is also capable of causing the voice interaction data 128 and the visual object 130 to be stored in storage 122. The storage 122 may also be used to store the data describing the association between the voice interaction data 128 and the visual object 130. In one or more techniques, the interaction association module 124 may be configured to update the voice interaction data 128 and the visual object 130 as different or additional commands and responses are identified (e.g., through machine learning) in connection with testing a voice-assisted interaction or during deployment of the voice-assisted interaction.

In contrast, the platform interface module 126 represents functionality of the voice interaction development system 104 to interact with any of a plurality of voice assistant platforms, including the voice assistant platform 106. In particular, the platform 126 provides formatted data indicative of voice interaction data to the voice assistant platform 106. This formatted data enables provision of voice assistance via one or more of the voice assistant devices 108 corresponding to the voice assistant platform 106 and is formatted in a format specific to the voice assistant platform 106. Indeed, each voice assistant platform may require data formatted in different ways to provide voice assistance functionality, such as with different headers, different payloads, different metadata associated with requests and responses, and so forth. To this end, the platform interface module 126 is capable of identifying which of the plurality of voice assistant platforms is being leveraged to provide voice assistance and also providing voice interaction data to the identified platform in its respective format.

The functionality of the interaction association module 124 and the platform interface module 126 is effective in concert with the voice interaction development tool 120 and a voice assistant device 108 to aid development of voice-assisted interactions in accordance with at least the following. The voice interaction development tool 120 causes display of a user interface that includes display of a flow diagram for controlling a particular voice-assisted interaction. In real-time, as the user 114 speaks the voice command 112, the voice interaction development tool 120 causes a flow diagram element corresponding to the spoken voice command 112 to be graphically indicated (e.g., highlighted or otherwise emphasized) and the voice assistant device 108 responds to the user 114 by outputting response content, such as by outputting audible content, visual content, or some combination thereof. Based on the voice assistant device 108's response, the user 114 may speak an additional voice command. In this scenario, the voice assistant interaction development tool 120 can cause—also in real-time—a different flow diagram element corresponding to the additional voice command to be graphically indicated. The voice assistant device 108 may also respond to this additional command by outputting additional response content. In this way, the described system provides graphical feedback for testing voice-assisted interactions being development. This graphical feedback enables problems with development of a voice-assisted interaction to be more easily identified than by using conventional techniques. In an end-use scenario, this graphical feedback can also be used to help hearing impaired individuals navigate through an interface designed primarily for voice assistance.

Having considered an example environment, consider now a discussion of some example details of the techniques for voice interaction development tool in a digital medium environment in accordance with one or more implementations.

Voice Interaction Development Tool

Figure 2:
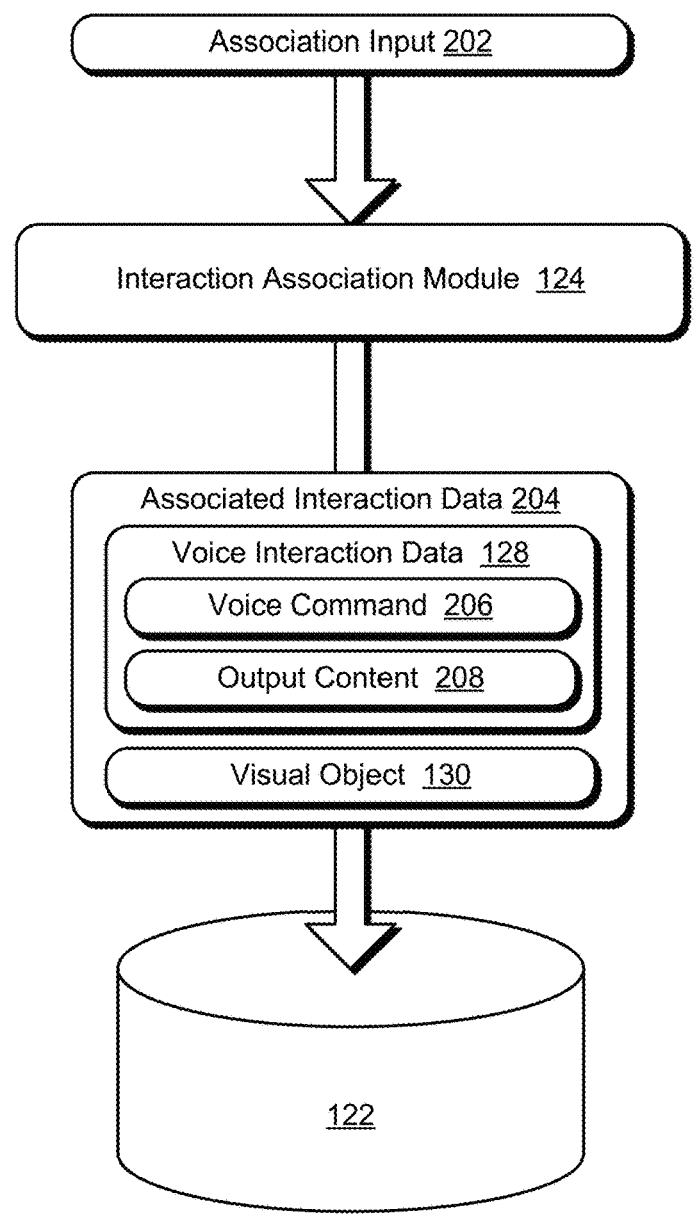
FIG. 2 depicts an example implementation in which the voice interaction development system of FIG. 1 generates associations between voice interaction data and visual objects and maintains the voice interaction data and visual objects.

FIG. 2 depicts an example implementation 200 in which a voice interaction development system of FIG. 1 generates associations between voice interaction data and visual objects and maintains the voice interaction data and visual objects. The illustrated example 200 includes from FIG. 1 the interaction association module 124 and the storage 122 of the voice interaction development system 104

The interaction association module 124 is depicted obtaining association input 202. The association input 202 may be received by the interaction association module 124 via a user interface of the voice interaction development tool 120, such as a user interface similar to the ones discussed in relation to FIGS. 4-6. Broadly speaking, the association input 202 specifies the voice interaction data 128 that correspond to the visual object 130. Based on the association input 202, the interaction association module 124 generates associated interaction data 204, which describes the association between the voice interaction data 128 and the visual object 130. This associated interaction data 204 may be maintained by the voice interaction development system 104, such that the voice interaction data 128 associated with the respective visual object 130 can be retrieved from the storage 122 based on identification of the visual object 130. In a similar manner, this enables the visual object 130 associated with the respective voice interaction data 128 to be retrieved from the storage 122 based on identification of the voice interaction data 128.

As illustrated, the interaction association module 124 causes the associated interaction data 204 to be stored in the storage 122. In accordance with the described techniques, the interaction association module 124 causes the voice interaction data 128 and the visual object 130 to be stored in the storage 122, e.g., for retrieval as part of testing a voice-assisted interaction. In this example 200 also, the voice interaction data 128 includes voice command 206 and output content 208. The voice command 206 may be configured as audio data or text data indicative of speech of a user to a voice assistant device 108. Further, the voice command 206 may correspond to the voice command 112, such that when the voice assistant device 108 receives the voice command 112 from the user 108, the voice interaction data 128 can be identified that includes the voice command 206 which matches the user 108's voice command 112.

In accordance with the described techniques, speech indicated by the voice command 206 is associated with the visual object 130. In scenarios where the visual object 130 corresponds to a flow diagram element, this allows each element of the flow diagram to be associated with a one or multiple speech phrases—based on a number of the voice commands 206 represented by the voice interaction data 128. By way of example, a visual object 130 that represents a particular flow diagram element for placing an order may be associated with multiple voice commands 206, such as "order," "place order," "place an order," and so on.

In contrast the voice command 206, the output content 208 represents the output of the voice assistant device 108—or other appropriate device such as connected appliances—in response to receipt of the voice command 206. In one or more implementations, the output content 208 is configured as data for audible output by the voice assistant device 108, e.g., audible speech. Additionally or alternately, the output content 208 may be configured as data for display by the voice assistant device 108 or another device. In response to a voice command such as "what's the weather," for instance, the output content 208 may be a graphical user interface having a summary of upcoming weather and configured for output via a display of the voice assistant device 108. Indeed, the output content 208 may be configured in a variety of ways as responding to a particular voice command 206 without departing from the spirit or scope of the described techniques.

Although the voice interaction data 128 and the visual object 130 are illustrated as being stored in the storage 122 of the voice interaction development system 104, this information may also be stored locally at the computing device 102. For instance, the voice interaction development tool 120 may generate a file that includes the voice interaction data 128 and the associated visual object 130, and cause the file to be stored in storage (not shown) of the computing device 102. In this scenario, the storage 122 represents remote storage of the voice interaction data 128 and the computing device 102's storage represents local storage. In one or more implementations, the voice interaction development tool 120 and the voice interaction development system 104 are configured to communicate to synchronize files stored locally at the computing device 102 with the associated interaction data 204 stored remotely in the storage 122 of the voice interaction development system.

The described techniques also involve interacting with the voice assistant platform 106 to aid development of a voice-assisted interaction. In this context, consider FIG. 3.

Figure 3:
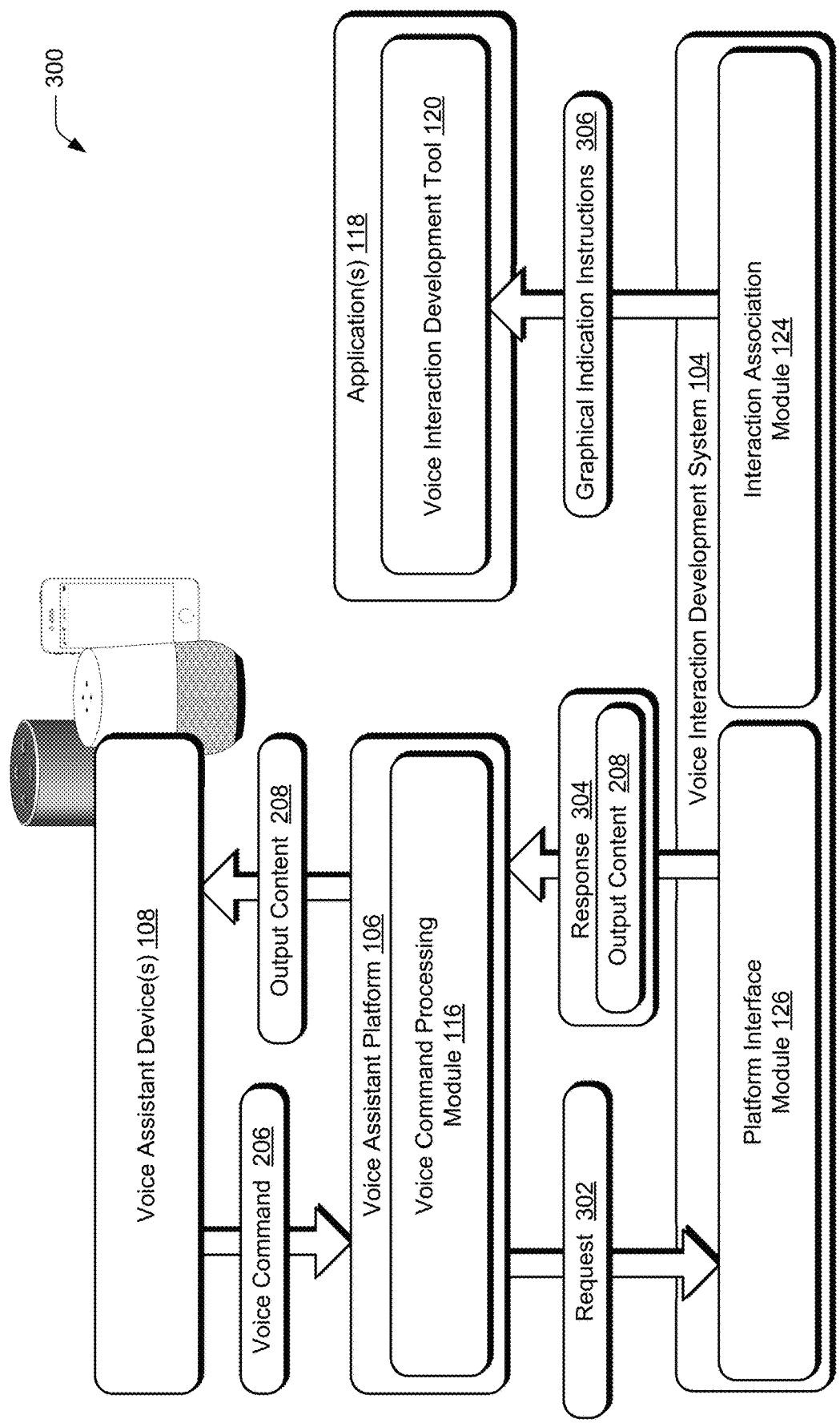
FIG. 3 depicts an example implementation in which the voice interaction development system of FIG. 1 facilitates development of a voice-assisted application through interactions with a voice assistant platform and a voice interaction development tool.

FIG. 3 depicts an example implementation 300 in which the voice interaction development system of FIG. 1 facilitates development of a voice-assisted application through interactions with a voice assistant platform and a voice interaction development tool. The illustrated example 300 includes from FIG. 1 the voice interaction development system 104, the voice assistant platform 106, and the voice assistant device 108.

In this example, the voice assistant platform 106 is shown obtaining the voice command 206 from the voice assistant device 108, such as when the user 114 speaks the corresponding voice command 112 to the voice assistant device. The voice assistant platform 106 is also shown communicating a request 302 to the voice interaction development system 104. The voice assistant platform 106 thus communicates the request 302 to the voice interaction development system 104 responsive to the voice command 206. In this way, the request 302 is initiated via the voice command 206 to the voice assistant platform 106. In any case, the voice command processing module 116 represents functionality to process the received voice command 206 and to generate the request 302 for handling by the voice interaction development system 104.

As noted above, the platform interface module 126 represents the functionality of the voice interaction development system to interact with the voice assistant platform 106. The platform interface module 126 represents functionality, for instance, to process the received request 302 to extract or otherwise determine the corresponding voice command 206. The platform interface module 126 also represents functionality to identify from the storage 122 the voice interaction data 128 that matches the voice command 206 of the request 302. To identify the voice interaction data 128 that matches the voice command 206 of the request 302, the platform interface module 126 may leverage a variety of techniques such as unique identifiers, hashes, text-based searches, and so forth. In any case, by identifying the matching voice interaction data 128, the platform interface module 126 can leverage the corresponding output content 208 and the associated visual object 130.

In accordance with the described techniques, the platform interface module 126 generates a response 304 to the request 302. The response 304 includes the output content 208 associated with the voice command 206, e.g., due to association of this data as part of the voice interaction data 128. In one or more implementations, the platform interface module 126 configures the response 304 in accordance with a format corresponding to the particular voice assistant platform 106. Indeed, a first voice assistant platform may be capable of processing responses configured according to a first format, a second voice assistant platform may be capable of processing responses configured according to a second format different from the first format, a third voice assistant platform may be capable of processing responses configured according to a third format different from both the first and second formats, and so forth. To this end, different voice assistant platforms may perpetuate a set of rules according to which such responses are to be configured—to enable application developers to develop applications that add "capabilities" or "skills" to the platform. Accordingly, the platform interface module 126 represents functionality to configure the response 304 in a format that complies with the set of rules perpetuated by the voice assistant platform 106.

Regardless of how the platform interface module 126 identifies the particular voice assistant platform and communicates the response 304 in a proper format for the identified voice assistant platform, the voice assistant platform 106 processes the response 304 and provides the output content 208 to the voice assistant device 108, e.g., over the network 110. The voice assistant device 108 then outputs the output content 208. As the voice assistant device 108 receives the voice commands 206 and outputs the output content 208, the voice interaction development tool 120 concurrently updates a display of at least a portion of a user interface.

Graphical indication instructions 306 instruct the voice interaction n development tool 120 how to update the user interface. By way of example, the graphical indication instructions 306 instruct the voice interaction development tool 120 to highlight or otherwise emphasize the visual object 130 that is associated with the voice command 206. For instance, the graphical indication instructions 306 instruct the voice interaction development tool 120 to emphasize a first flow diagram element associated with the voice command 206. The interaction association module 124 may then update the graphical indication instructions 306 based on communication of the response 304 such that, as updated, the graphical indication instructions 306 instruct the voice interaction development tool 120 to highlight or otherwise emphasize the visual object 130 that is associated with the output content 208. For instance, the graphical indications instructions 306 as updated instruct the voice interaction development tool 120 to emphasize a second flow diagram element associated with the output content

208. In some cases, the voice interaction development tool 120 is implemented as a plug-in or extension which controls a corresponding application 118 to update the user interface based on the graphical indication instructions 306. As described throughout, the voice interaction development tool 120 can be implemented as an extension or plug-in for a variety of different types of applications. In the context of displaying and updating a user interface to aid development of voice-assisted interactions, consider FIGS. 4-6.

Figure 4:
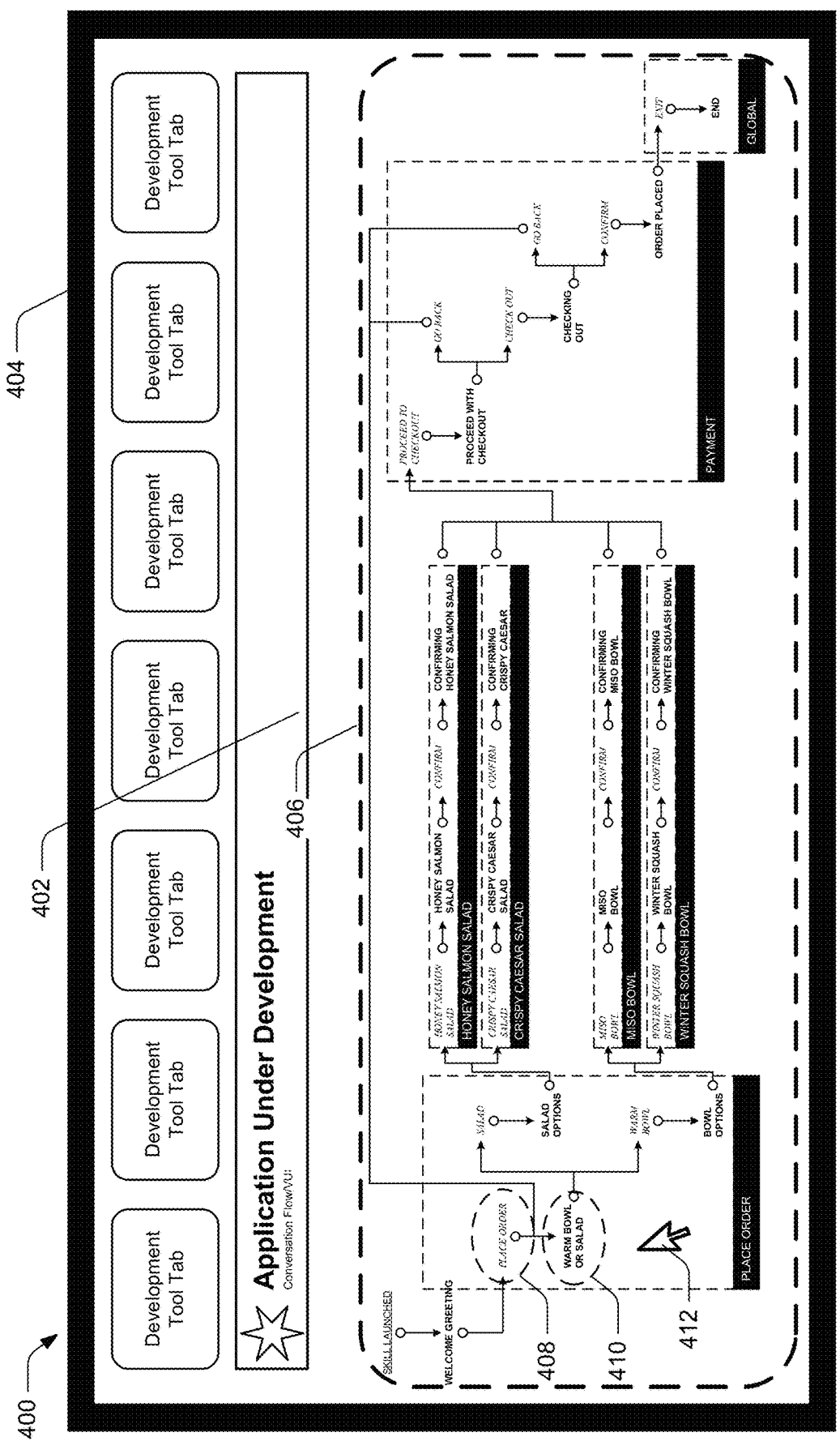
FIG. 4 depicts an example user interface of a voice interaction development tool used in connection with development of a voice-assisted application.

FIG. 4 depicts an example 400 of a user interface of a voice interaction development tool used in connection with development of a voice-assisted application.

The illustrated example 400 includes a voice-interaction development interface 402 displayed via display device 404. In this example 400, the voice interaction development interface 402 is depicted including a flow diagram 406 of a voice-assisted interaction. The flow diagram 406 includes a variety of elements representing requests (e.g., voice commands received from a user) and responses (e.g., content output by a voice assistant device) that can occur during the voice-assisted interaction. In one or more implementations, flow diagram elements representing requests may be visually distinguished from flow diagram elements representing responses, such as by using different fonts, different colors, different shapes surrounding the elements, different font effects (e.g., bold, italic, underline), different combinations of these, and so forth. Indeed, flow diagram elements representing requests may be visually distinguished from flow diagram elements representing responses in other ways without departing from the spirit or scope of the described techniques.

The illustrated flow diagram 406's variety of elements include example request 408 and example response 410. In accordance with the described techniques, the example request 408 is visually distinguished from the example response 410. In this case, the example request 408 and the example response 410 have different fonts with different font effects applied. In addition, each of the depicted elements in the flow diagram 406 representing requests have a same font with the same text effects applied as the example request 408. Similarly, each of the depicted elements in the flow diagram 406 representing responses have a same font with the same text effects applied as the example response 410.

The illustrated example 400 also includes a cursor 412, which represents functionality to enable a user to provide input to select an element of the flow diagram 406. Although the cursor 412 is illustrated, in one or more implementations there may be no displayed cursor. Additionally or alternatively, the flow diagram elements may be selected in other ways, such as via touch input (or other gesture input), keyboard input, stylus input, voice input, and so forth. In the context of selecting one of the flow diagram 406's elements, consider FIG. 5.

Figure 5:
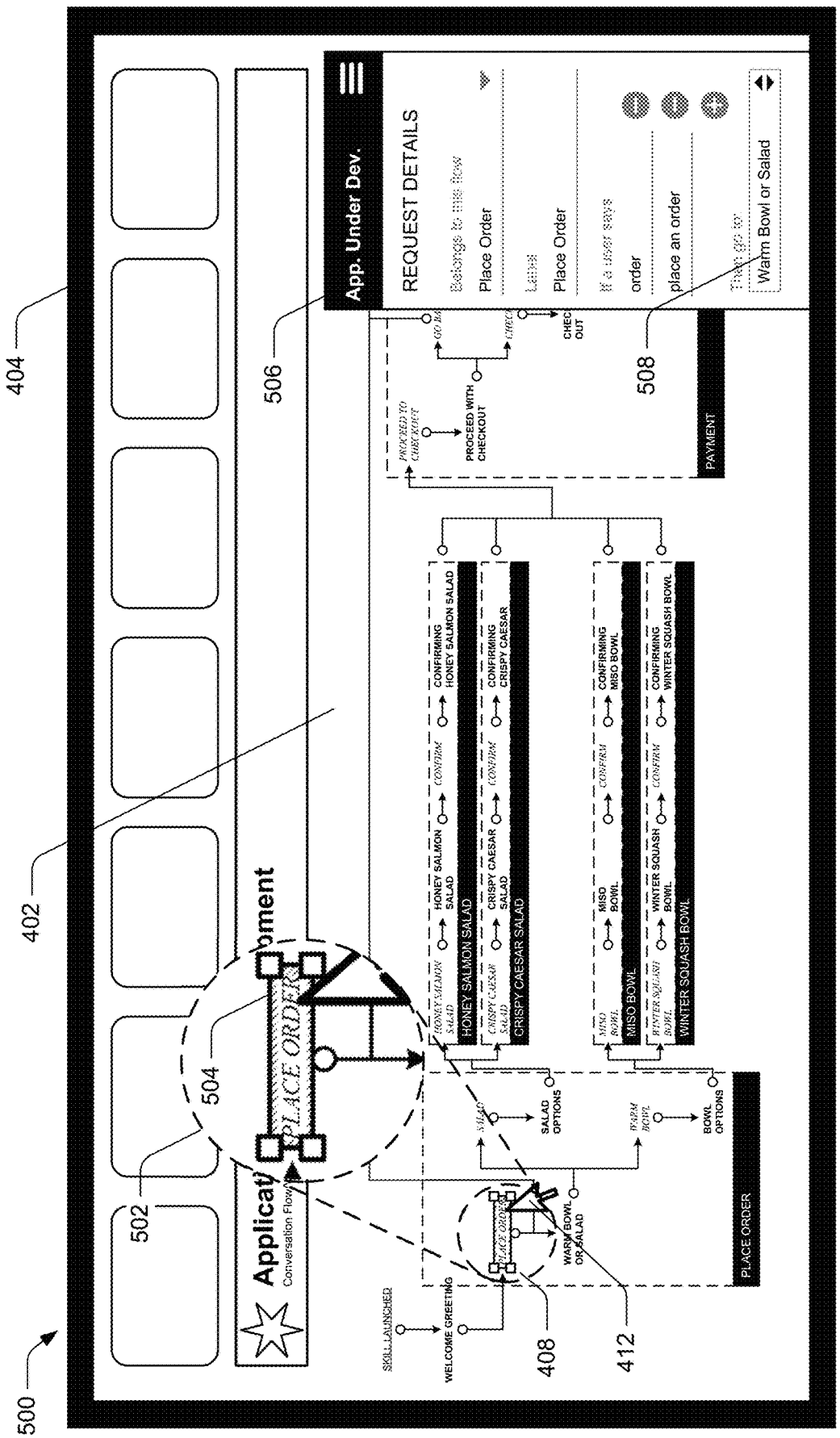
FIG. 5 depicts another example of the user interface in which a flow diagram element representing a request of a voice-assisted interaction is graphically indicated.

FIG. 5 depicts another example 500 of the user interface in which a flow diagram element representing a request of a voice-assisted interaction is graphically indicated.

In this example 500, the cursor 412 is depicted selecting the example request 408. The example request 408 is further graphically emphasized, as depicted in detail in zoomed view 502. In particular, the example request 408 is illustrated with graphical emphasis 504. This indicates that a focus of the voice interaction development tool 120 is on the example request 408. Although the graphical emphasis 504 is illustrated as a combination of shapes and hashing, flow diagram elements may be graphically emphasized (e.g., when selected, based on a flow of the interaction proceeding to a determined response, etc.) in a variety of ways without departing from the spirit or scope of the described techniques.

The illustrated example 500 also includes request dialog 506. Here, the request dialog 506 corresponds to the selected example request 408. The request dialog 506 represents functionality of the voice interaction development tool 120 that enables a user to specify voice interaction data for a visual element. In cases in which the voice interaction development tool 120 is implemented as an extension or plug-in to the application 118, the voice interaction development tool 120 controls the display of the request dialog 506 while the application 118 provides the user interface of example 500. In this particular example 500, the request dialog 506 represents functionality that enables a user to specify voice commands (e.g., "order," "place an order," and additional commands) for the example request 408. In one or more implementations, such commands trigger an action associated with the flow diagram element, such as proceed to a next element of the flow diagram. In this context, the request dialog 506 is also illustrated with a go-to-next instrumentality 508. The go-to-next instrumentality 508 represents functionality of the voice interaction development tool 120 that enables the user to specify a next element of the flow diagram 406 to proceed to responsive to receiving voice commands specified for the example request 408. Indeed, user interface instrumentalities may enable different information to be specified or defined in relation to a focused on flow diagram element in the spirit and the scope of the described techniques.

Figure 6:
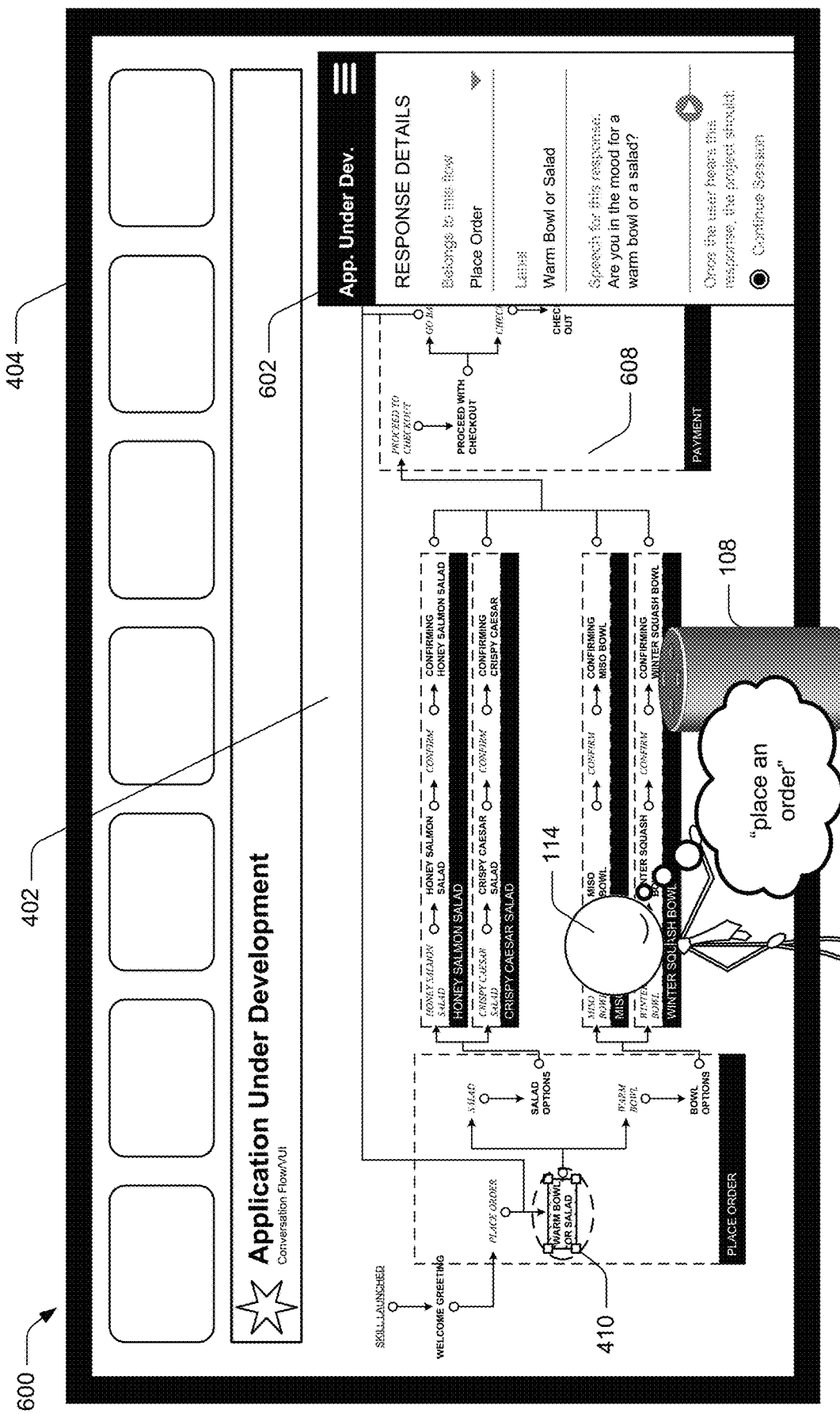
FIG. 6 depicts another example of the user interface in which a different flow diagram element representing a response of the voice-assisted interaction is graphically indicated.

FIG. 6 depicts another example 600 of the user interface in which a different flow diagram element representing a response of the voice-assisted interaction is graphically indicated.

In this example 600, the user 114 is depicted speaking a voice command to the voice assistant device 108. Also in this example 600, the example response 410 is depicted as being graphically emphasized. Although not shown in a zoomed view, the example response 410 is graphically emphasized in a similar manner as the example request 408 is illustrated in FIG. 5. This is simply to illustrate that in a continuing scenario between FIGS. 5 and 6, the focus of the voice interaction development tool 120 is changed from the example request 408 to the example response 410.

This change of focus is initiated based on the voice assistant device 108 receiving the user 114's voice command, which in this example is depicted as "place an order." In operation, the update from graphically emphasizing the first flow diagram element (e.g., the example request 408) to graphically emphasizing the second flow diagram element (e.g., the example response 410), occurs in substantially real-time after the voice assistant device 108 receives the voice command—and responsive to receipt of the voice command. In this way, the voice-interaction development interface 402 visually indicates how speaking certain phrases actually cause a voice interaction controlled by the flow diagram 406 to proceed.

The illustrated example 600 also includes response dialog 602, which corresponds to the focused on example response 410. The response dialog 602 represents functionality of the voice interaction development tool 120 that enables a user to specify voice interaction data for visual elements corresponding to responses, such as the content output by the voice assistant device 108. By way of example, the illustrated response dialog 602 includes response speech "Are you in the mood for a warm bowl or a salad?" Thus, by triggering the example response 410—by speaking "place an order" to the voice assistant device 108—the voice assistant device 108 may output the noted response speech while the voice-interaction development interface 402 concurrently graphically emphasizes the example response 410. Certainly, the response dialog 602 or other user interface instrumentalities may enable a variety of information to be specified or defined in relation to a focused on response of the flow diagram in the spirit and the scope of the described techniques.

Having discussed example details of the techniques for a voice interaction development tool, consider now some example procedures to illustrate additional aspects of the techniques.

Example Procedures

This section describes example procedures for a voice interaction development tool in one or more implementations. Aspects of the procedures may be implemented in hardware, firmware, or software, or a combination thereof. The procedures are shown as a set of blocks that specify operations performed by one or more devices and are not necessarily limited to the orders shown for performing the operations by the respective blocks. In at least some implementations the procedures are performed by a suitably configured device, such as the computing device 102 that makes use of the voice interaction development tool 120 and the voice interaction development system 104 that makes use of the interaction association module 124 and the platform interface module 126.

Figure 7:
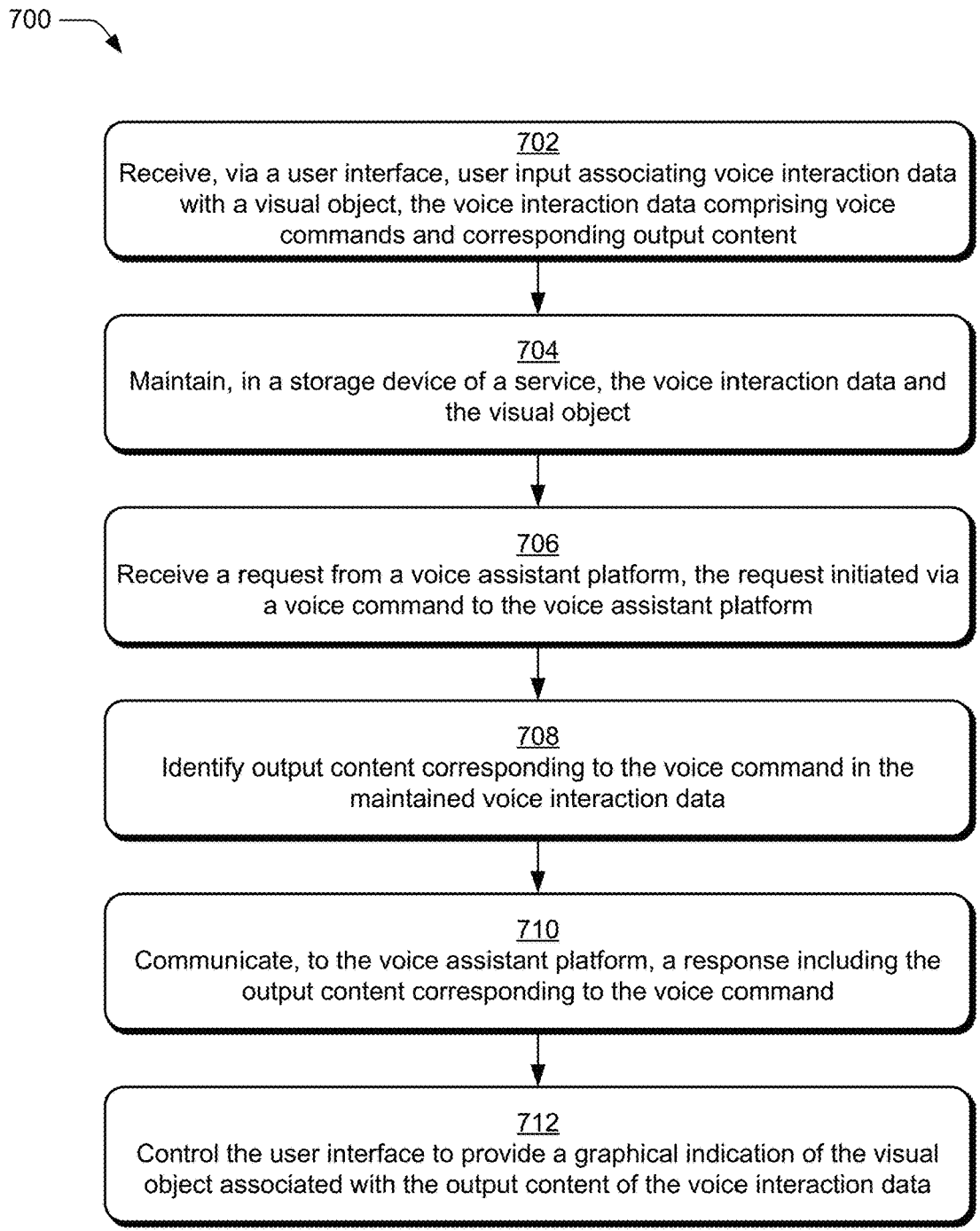
FIG. 7 depicts a procedure in an example implementation in which a user interface is controlled to graphically indicate a visual object that is associated with output content of voice interaction data.

FIG. 7 depicts an example procedure 700 in which instructions a user interface is controlled to graphically indicate a visual object that is associated with output content of voice interaction data.

User input associating voice interaction data with a visual object is received via a user interface, (block 702). In accordance with the principles discussed herein, the voice interaction data includes voice commands and corresponding output content. By way of example, the interaction association module 124, of the voice interaction development system 104, obtains association input 202. The association input 202 may be received by the interaction association module 124 via a user interface of the voice interaction development tool 120, such as a user interface similar to the ones discussed in relation to FIGS. 4-6. Broadly speaking, the association input 202 specifies the voice interaction data 128 that correspond to the visual object 130.

The voice interaction data and the visual object are maintained in a storage device of a service (block 704). By way of example, based on the association input 202, the interaction association module 124 generates associated interaction data 204, which describes the association between the voice interaction data 128 and the visual object 130. This association interaction data 204 may be maintained by the voice interaction development system 104, such that the voice interaction data 128 associated with the respective visual object 130 can be retrieved from the storage 122 based on identification of the visual object 130. In a similar manner, this enables the visual object 130 associated with the respective voice interaction data 128 to be retrieved from the storage 122 based on identification of the voice interaction data 128.

In some cases the interaction association module 124 causes the associated interaction data 204 to be stored in the storage 122. In accordance with the described techniques, the interaction association module 124 causes the voice interaction data 128 and the visual object 130 to be stored in the storage 122, e.g., for retrieval as part of testing a voice-assisted interaction. In this example 200 also, the voice interaction data 128 includes voice command 206 and output content 208. The voice command 206 may be configured as audio data or text data indicative of speech of a user to a voice assistant device 108. Further, the voice command 206 may correspond to the voice command 112, such that when the voice assistant device 108 receives the voice command 112 from the user 114, the voice interaction data 128 can be identified that includes the voice command 206 which matches the user 114's voice command 112.

In accordance with the described techniques, speech indicated by the voice command 206 is associated with the visual object 130. In scenarios where the visual object 130 corresponds to a flow diagram element, this allows each element of the flow diagram to be associated with a one or multiple speech phrases—based on a number of the voice commands 206 represented by the voice interaction data 128. By way of example, a visual object 130 that represents a particular flow diagram element for placing an order may be associated with multiple voice commands 206, such as "order," "place order," "place an order," and so on.

In contrast the voice command 206, the output content 208 represents the output of the voice assistant device 108—or other appropriate device such as connected appliances—in response to receipt of the voice command 206. In one or more implementations, the output content 208 is configured as data for audible output by the voice assistant device 108, e.g., audible speech. Additionally or alternately, the output content 208 may be configured as data for display by the voice assistant device 108 or another device. In response to a voice command such as "what's the weather," for instance, the output content 208 may be a graphical user interface having a summary of upcoming weather and configured for output via a display of the voice assistant device 108. Indeed, the output content 208 may be configured in a variety of ways as responding to a particular voice command 206 without departing from the spirit or scope of the described techniques.

In some cases, the voice interaction data 128 and the visual object 130 may also be stored locally at the computing device 102. For instance, the voice interaction development tool 120 may generate a file that includes the voice interaction data 128 and the associated visual object 130, and cause the file to be stored in storage of the computing device 102. In this scenario, the storage 122 represents remote storage of the voice interaction data 128 and the computing device 102's storage represents local storage. In one or more implementations, the voice interaction development tool 120 and the voice interaction development system 104 are configured to communicate to synchronize files stored locally at the computing device 102 with the associated interaction data 204 stored remotely in the storage 122 of the voice interaction development system.

A request is received from a voice assistant platform (block 706). In accordance with the principles discussed herein, the request is initiated via a voice command to a voice assistant platform. By way of example, the voice assistant platform 106 obtains the voice command 206 from the voice assistant device 108, such as when the user 114 speaks the corresponding voice command 112 to the voice assistant device. The voice assistant platform 106 then communicates a request 302 to the voice interaction development system 104. The voice assistant platform 106 thus communicates the request 302 to the voice interaction development system 104 responsive to the voice command 206. In this way, the request 302 is initiated via the voice command 206 to the voice assistant platform 106.

Output content corresponding to the voice command is identified in the maintained voice interaction data (block 708). By way of example, the platform interface module 126, of the voice interaction development system, processes the received request 302 to extract or otherwise determine the corresponding voice command 206. Then, the platform interface module 126 identifies, from the storage 122, the voice interaction data 128 that matches the voice command 206 of the request 302. To identify the voice interaction data 128 that matches the voice command 206 of the request 302, the platform interface module 126 may leverage a variety of techniques such as unique identifiers, hashes, text-based searches, and so forth. In any case, by identifying the matching voice interaction data 128, the platform interface module 126 can identify the corresponding output content 208 and the associated visual object 130.

A response that includes the output content corresponding to the voice command is communicated to the voice assistant platform (block 710). By way of example, the platform interface module 126, of the voice interaction development system 104, generates a response 304 to the request 302. The response 304 includes the output content 208 associated with the voice command 206, e.g., due to association of this data as part of the voice interaction data 128.

In one or more implementations, the platform interface module 126 configures the response 304 in accordance with a format corresponding to the particular voice assistant platform 106. Indeed, a first voice assistant platform may be capable of processing responses configured according to a first format, a second voice assistant platform may be capable of processing responses configured according to a second format different from the first format, a third voice assistant platform may be capable of processing responses configured according to a third format different from both the first and second formats, and so forth. To this end, different voice assistant platforms may perpetuate a set of rules according to which such responses are to be configured—to enable application developers to develop applications that add "capabilities" or "skills" to the platform. Accordingly, the platform interface module 126 may configure the response 304 in a format that complies with the set of rules perpetuated by the voice assistant platform 106.

Regardless of how the platform interface module 126 identifies the particular voice assistant platform and communicates the response 304 in a proper format for the identified voice assistant platform, the response 304 causes the voice assistant platform 106 to process the response 304 and provide the output content 208 to the voice assistant device 108, e.g., over the network 110. The voice assistant device 108 then outputs the output content 208.

The user interface is controlled to provide a graphical indication of the visual object associated with the output content of the voice interaction data (block 712). By way of example, as the voice assistant device 108 receives the voice commands 206 and outputs the output content 208, the voice interaction development tool 120 concurrently updates a display of at least a portion of a user interface.

Graphical indication instructions 306 instruct the voice interaction n development tool 120 how to update the user interface. By way of example, the graphical indication instructions 306 instruct the voice interaction development tool 120 to highlight or otherwise emphasize the visual object 130 that is associated with the voice command 206. For instance, the graphical indication instructions 306 instruct the voice interaction development tool 120 to emphasize a first flow diagram element associated with the voice command 206. The interaction association module 124 may then update the graphical indication instructions 306 based on communication of the response 304 such that, as updated, the graphical indication instructions 306 instruct the voice interaction development tool 120 to highlight or otherwise emphasize the visual object 130 that is associated with the output content 208. For instance, the graphical indications instructions 306 as updated instruct the voice interaction development tool 120 to emphasize a second flow diagram element associated with the output content 208.

Figure 8:
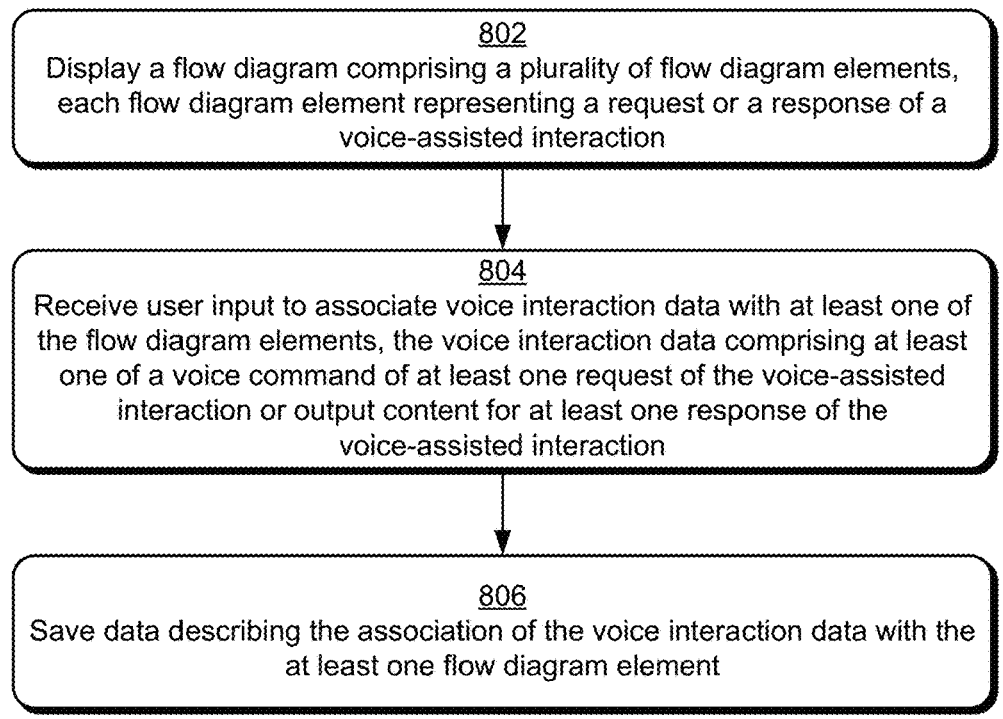
FIG. 8 depicts a procedure in an example implementation in which a user interface provides functionality to associate voice interaction data with elements of a digital flow diagram to control a voice-assisted interaction.

FIG. 8 depicts an example procedure 800 in which a user interface provides functionality to associate voice interaction data with elements of a digital flow diagram to control a voice-assisted interaction.

A flow diagram including a plurality of flow diagram elements is displayed (block 702). In accordance with the principles discussed herein, each flow diagram element represents a request or a response of a voice-assisted interaction. By way of example, as depicted in FIG. 4, the voice interaction development tool 120 causes display of the voice interaction development interface 402, which includes a flow diagram 406 of a voice-assisted interaction. The flow diagram 406 includes a variety of elements representing requests 408 (e.g., voice commands received from a user) and responses 410 (e.g., content output by a voice assistant device) that can occur during the voice-assisted interaction.

User input to associate voice interaction data with at least one of the flow diagram elements is received (block 804). In accordance with the principles discussed herein, the voice interaction data includes at least one of a voice command of at least one request of the voice-assisted interaction or output content for at least one response of the voice-assisted interaction. By way of example, as depicted in FIG. 5, the cursor 412 selects the example request 408. In response, a request dialog 506, corresponding to the selected request 408, is displayed in the voice interaction development interface 402. The request dialog 506 enables a user to specify voice interaction data for a visual element, such as by specifying voice commands (e.g., "order," "place an order," and additional commands) for the example request 408. In one or more implementations, such commands trigger an action associated with the flow diagram element, such as proceed to a next element of the flow diagram. In this context, the request dialog 506 is also illustrated with a go-to-next instrumentality 508. The go-to-next instrumentality 508 represents functionality of the voice interaction development tool 120 that enables the user to specify a next element of the flow diagram 406 to proceed to responsive to receiving voice commands specified for the example request 408. Indeed, user interface instrumentalities may enable different information to be specified or defined in relation to a focused on flow diagram element in the spirit and the scope of the described techniques.

Data describing the association of the voice interaction data with the at least one flow diagram element is saved (block 806). By way of example, the interaction association module 124 generates associated interaction data 204, which describes the association between the voice interaction data 128 and the flow diagram elements of flow diagram 406. This associated interaction data 204 may be saved or maintained by the voice interaction development system 104. In some cases the interaction association module 124 causes the associated interaction data 204 to be stored in the storage 122. In some cases, the voice interaction data 128 and the flow diagram element may also be stored locally at the computing device 102. For instance, the voice interaction development tool 120 may generate a file that includes the voice interaction data 128 and the associated flow diagram element, and cause the file to be stored in storage of the computing device 102. In one or more implementations, the voice interaction development tool 120 and the voice interaction development system 104 are configured to communicate to synchronize files stored locally at the computing device 102 with the associated interaction data 204 stored remotely in the storage 122 of the voice interaction development system.

Having described example procedures in accordance with one or more implementations, consider now an example system and device that can be utilized to implement the various techniques described herein.

Example System and Device

Figure 9:
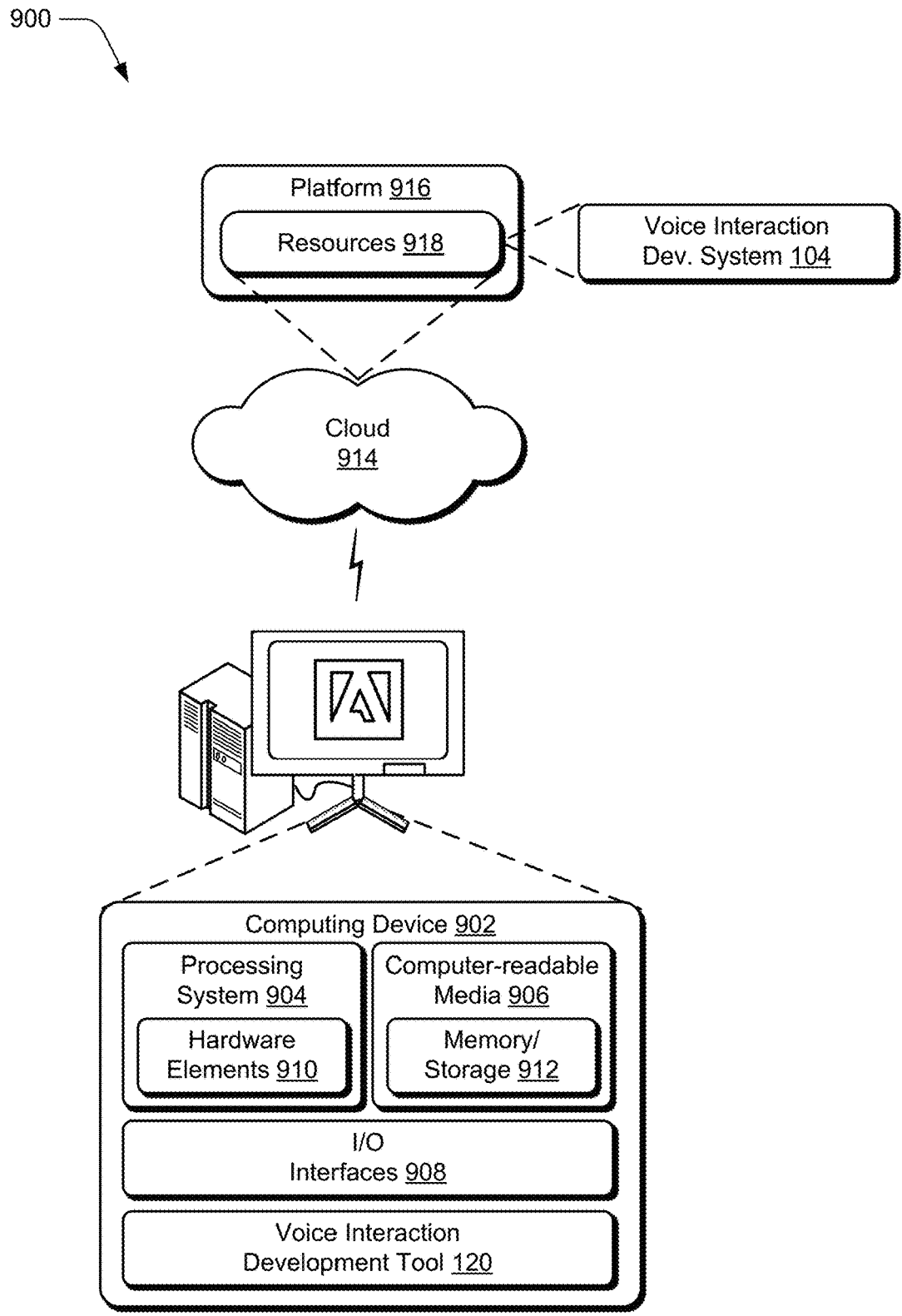
FIG. 9 illustrates an example system including various components of an example device that can be implemented as any type of computing device as described and/or utilized with reference to FIGS. 1-8 to implement embodiments of the techniques described herein.

FIG. 9 illustrates an example system generally at 900 that includes an example computing device 902 that is representative of one or more computing systems and/or devices that may implement the various techniques described herein. This is illustrated through inclusion of the voice interaction development system 104 and the voice interaction development tool 120. The computing device 902 may be, for example, a server of a service provider, a device associated with a client (e.g., a client device), an on-chip system, and/or any other suitable computing device or computing system.

The example computing device 902 as illustrated includes a processing system 904, one or more computer-readable media 906, and one or more I/O interfaces 908 that are communicatively coupled, one to another. Although not shown, the computing device 902 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 904 is representative of functionality to perform one or more operations using hardware. Accordingly, the processing system 904 is illustrated as including hardware elements 910 that may be configured as processors, functional blocks, and so forth. This may include implementation in hardware as an application specific integrated circuit or other logic device formed using one or more semiconductors. The hardware elements 910 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 906 is illustrated as including memory/storage 912. The memory/storage 912 represents memory/storage capacity associated with one or more computer-readable media. The memory/storage component 912 may include volatile media (such as random access memory (RAM)) and/or nonvolatile media (such as read only memory (ROM), Flash memory, optical disks, magnetic disks, and so forth). The memory/storage component 912 may include fixed media (e.g., RAM, ROM, a fixed hard drive, and so on) as well as removable media (e.g., Flash memory, a removable hard drive, an optical disc, and so forth). The computer-readable media 906 may be configured in a variety of other ways as further described below.

Input/output interface(s) 908 are representative of functionality to allow a user to enter commands and information to computing device 902, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 902 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 902. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 902, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 910 and computer-readable media 906 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 910. The computing device 902 may be configured to implement particular instructions and/or functions corresponding to the software and/or hardware modules. Accordingly, implementation of a module that is executable by the computing device 902 as software may be achieved at least partially in hardware, e.g., through use of computer-readable storage media and/or hardware elements 910 of the processing system 904. The instructions and/or functions may be executable/operable by one or more articles of manufacture (for example, one or more computing devices 902 and/or processing systems 904) to implement techniques, modules, and examples described herein.

The techniques described herein may be supported by various configurations of the computing device 902 and are not limited to the specific examples of the techniques described herein. This functionality may also be implemented all or in part through use of a distributed system, such as over a "cloud" 914 via a platform 916 as described below.

The cloud 914 includes and/or is representative of a platform 916 for resources 918. The platform 916 abstracts underlying functionality of hardware (e.g., servers) and software resources of the cloud 914. The resources 918 may include applications and/or data that can be utilized while computer processing is executed on servers that are remote from the computing device 902. Resources 918 can also include services provided over the Internet and/or through a subscriber network, such as a cellular or Wi-Fi network.

The platform 916 may abstract resources and functions to connect the computing device 902 with other computing devices. The platform 916 may also serve to abstract scaling of resources to provide a corresponding level of scale to encountered demand for the resources 918 that are implemented via the platform 916. Accordingly, in an interconnected device embodiment, implementation of functionality described herein may be distributed throughout the system 900. For example, the functionality may be implemented in part on the computing device 902 as well as via the platform 916 that abstracts the functionality of the cloud 914.

Conclusion

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment a method implemented by at least one server device associated with the service, the method comprising:
    causing display of a visual flow diagram by a computing device, the visual flow diagram configured to enable testing of a voice assisted application to be implemented by a voice assistant platform, and the visual flow diagram comprising a plurality of flow diagram elements, the flow diagram elements representing voice commands and respective responses by a voice assistant device associated with the voice assistant platform;
    receiving a request from the voice assistant platform, the request initiated via a spoken voice command by a user to the voice assistant device associated with the voice assistant platform, the voice assistant device separate from the computing device that displays the visual flow diagram;
    responsive to the request, identifying output content that is configured to be output by the voice assistant device responsive to the voice command;
    formatting a response to the voice command based on a set of rules associated with the voice assistant platform;
    communicating, to the voice assistant platform, the formatted response to the voice command that includes the output content corresponding to the voice command, the communicating of the formatted response causing the voice assistant device to audibly output the output content; and
    in real-time and concurrently with the voice assistant device outputting the output content, updating the visual flow diagram displayed by the computing device by highlighting a respective visual flow element associated with the output content that is audibly output by the voice assistant device.

2. A method as described in claim 1, further comprising highlighting an additional respective visual flow element associated with the voice command in the visual flow diagram in real-time as the voice command is received by the voice assistant device associated with the voice assistant platform.

3. A method as described in claim 1, further comprising identifying the voice assistant platform from a plurality of voice assistant platforms.

4. The method as described in claim 1, wherein the voice assistant device comprises a dedicated voice assistant device.

5. The method as described in claim 1, further comprising:
    receiving, via a user interface, user input associating voice interaction data with the visual flow diagram, the voice interaction data comprising voice commands and corresponding output content of the voice assisted application; and
    maintaining, in a storage device, the voice interaction data and the visual flow diagram.

6. A method as described in claim 1, wherein the voice assistant device comprises a dedicated voice assistant device that includes a microphone.

7. A system comprising:
    at least one processor; and
    memory having stored thereon computer-readable instructions that are executable by the at least one processor to perform operations including:

causing display of a visual flow diagram by a computing device, the visual flow diagram configured to enable testing of a voice assisted application to be implemented by a voice assistant platform, and the visual flow diagram comprising a plurality of flow diagram elements, the flow diagram elements representing voice commands and respective responses by a voice assistant device associated with the voice assistant platform;

receiving a request from the voice assistant platform, the request initiated via a spoken voice command by a user to the voice assistant device associated with the voice assistant platform, the voice assistant device separate from the computing device that displays the visual flow diagram;

responsive to the request, identifying output content that is configured to be output by the voice assistant device responsive to the voice command;

formatting a response to the voice command based on a set of rules associated with the voice assistant platform;

communicating, to the voice assistant platform, the formatted response to the voice command that includes the output content corresponding to the voice command, the communicating of the formatted response causing the voice assistant device to audibly output the output content; and in real-time and concurrently with the voice assistant device outputting the output content, updating the visual flow diagram displayed by the computing device by highlighting a respective visual flow element associated with the output content that is audibly output by the voice assistant device.

8. A system as described in claim 7, wherein the operations further include identifying the voice assistant platform from a plurality of voice assistant platforms.

9. The system as described in claim 7, wherein the operations further comprise:
receiving, via a user interface, user input associating voice interaction data with the visual flow diagram, the voice interaction data comprising voice commands and corresponding output content of the voice assisted application; and
maintaining, in a storage device, the voice interaction data and the visual flow diagram.

10. The system as described in claim 7, wherein the voice assistant device comprises a dedicated voice assistant device.

11. The system as described in claim 10, wherein the dedicated voice assistant device includes a microphone.

12. The system as described in claim 10, wherein the dedicated voice assistant device includes a microphone and a display screen.

13. One or more computer-readable storage devices having instructions stored thereon that, responsive to execution by one or more processors, perform operations comprising:
causing display of a visual flow diagram by a computing device, the visual flow diagram configured to enable testing of a voice assisted application to be implemented by a voice assistant platform, and the visual flow diagram comprising a plurality of flow diagram elements, the flow diagram elements representing voice commands and respective responses by a voice assistant device associated with the voice assistant platform;

receiving a request from the voice assistant platform, the request initiated via a spoken voice command by a user to the voice assistant device associated with the voice assistant platform, the voice assistant device separate from the computing device that displays the visual flow diagram;

responsive to the request, identifying output content that is configured to be output by the voice assistant device responsive to the voice command;

formatting a response to the voice command based on a set of rules associated with the voice assistant platform;

communicating, to the voice assistant platform, the formatted response to the voice command that includes the output content corresponding to the voice command, the communicating of the formatted response causing the voice assistant device to audibly output the output content; and in real-time and concurrently with the voice assistant device outputting the output content, updating the visual flow diagram displayed by the computing device by highlighting a respective visual flow element associated with the output content that is audibly output by the voice assistant device.

14. One or more computer-readable storage devices as described in claim 13, wherein the operations further comprise highlighting an additional respective visual flow element associated with the voice command in the visual flow diagram in real-time as the voice command is received by the voice assistant device associated with the voice assistant platform.

15. One or more computer-readable storage devices as described in claim 13, wherein the operations further comprise identifying the voice assistant platform from a plurality of voice assistant platforms.

16. One or more computer-readable storage devices as described in claim 13, wherein the voice assistant device comprises a dedicated voice assistant device.

17. One or more computer-readable storage devices as described in claim 13, wherein the operations further comprise:
receiving, via a user interface, user input associating voice interaction data with the visual flow diagram, the voice interaction data comprising voice commands and corresponding output content of the voice assisted application; and
maintaining, in a storage device, the voice interaction data and the visual flow diagram.

18. One or more computer-readable storage devices as described in claim 13, wherein the voice assistant device comprises a dedicated voice assistant device.

19. One or more computer-readable storage devices as described in claim 18, wherein the dedicated voice assistant device includes a microphone.

20. One or more computer-readable storage devices as described in claim 18, wherein the dedicated voice assistant device includes a microphone and a display screen.

* * * * *

UNITED STATES PATENT AND TRADEMARK OFFICE
CERTIFICATE OF CORRECTION

PATENT NO.         : 10,908,883 B2
APPLICATION NO.    : 16/189063
DATED              : February 2, 2021
INVENTOR(S)        : Mark C. Webster et al.

It is certified that error appears in the above-identified patent and that said Letters Patent is hereby corrected as shown below:

In the Claims

Column 20, Line 7, after "one server device", delete "associated with the service", therefor.

Signed and Sealed this
Thirtieth Day of March, 2021

Drew Hirshfeld
*Performing the Functions and Duties of the*
*Under Secretary of Commerce for Intellectual Property and*
*Director of the United States Patent and Trademark Office*